US008156131B2

(12) United States Patent
Marsden et al.

(10) Patent No.: US 8,156,131 B2
(45) Date of Patent: Apr. 10, 2012

(54) QUALITY MEASURE FOR A DATA CONTEXT SERVICE

(75) Inventors: Richard G. Marsden, Houston, TX (US); Gaelle Abecassis, Sugar Land, TX (US); Yu Lin, Houston, TX (US); Trond Benum, Trondheim (NO); Cyril Laroche-Py, Houston, TX (US); Floyd Louis Broussard, III, The Woodlands, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 317 days.

(21) Appl. No.: 12/464,227

(22) Filed: May 12, 2009

(65) Prior Publication Data

US 2010/0121861 A1 May 13, 2010

Related U.S. Application Data

(63) Continuation-in-part of application No. 12/198,780, filed on Aug. 26, 2008.

(60) Provisional application No. 60/968,304, filed on Aug. 27, 2007.

(51) Int. Cl.
*G06F 17/30* (2006.01)

(52) U.S. Cl. ......... 707/752; 707/722; 707/758; 707/769

(58) Field of Classification Search .................. 707/600, 707/603, 705, 706, 722, 723, 728, 736, 748, 707/749, 750, 752, 758, 776, 769
See application file for complete search history.

(56) References Cited

U.S. PATENT DOCUMENTS

| | | | |
|---|---|---|---|
| 5,992,519 | A | 11/1999 | Ramakrishnan et al. |
| 6,012,016 | A | 1/2000 | Bilden et al. |
| 6,018,497 | A | 1/2000 | Gunasekera |
| 6,078,869 | A | 6/2000 | Gunasekera |
| 6,098,064 | A | 8/2000 | Pirolli et al. |
| 6,106,561 | A | 8/2000 | Farmer |

(Continued)

FOREIGN PATENT DOCUMENTS

GB 2336008 10/1999

(Continued)

OTHER PUBLICATIONS

Finkelstein, L., et al., Placing Search in Context: The Concept Revisited, WWW10, May 2-5, 2001, Hong Kong, 10 pages.

(Continued)

*Primary Examiner* — Debbie Le
*Assistant Examiner* — Evan Aspinwall
(74) *Attorney, Agent, or Firm* — Colin L. Wier

(57) ABSTRACT

The method for providing a data context service involves extracting context information from a host application associated with an oilfield project, the context information includes a current state of a user in the host application, sorting the context information into multiple dimensions of relevance, generating a search profile for each of the multiple dimensions of relevance, requesting a first set of searches using at least the search profile, receiving oilfield data items resulting from the first set of searches, obtaining a quality measure of an oilfield data item of the oilfield data items based on a pre-determined quality criterion, sending the oilfield data item as a search result to the host application after determining the quality measure exceeds a pre-determined threshold, and generating an output using the host application based on the search result, the output being used to perform an oilfield operation.

20 Claims, 9 Drawing Sheets

U.S. PATENT DOCUMENTS

| | | | | |
|---|---|---|---|---|
| 6,230,101 | B1 | 5/2001 | Wallis | |
| 6,313,837 | B1 | 11/2001 | Assa et al. | |
| 6,633,868 | B1 | 10/2003 | Min et al. | |
| 6,826,437 | B2 | 11/2004 | Hobbs et al. | |
| 6,980,940 | B1 | 12/2005 | Gurpinar et al. | |
| 7,164,990 | B2 | 1/2007 | Bratvedt et al. | |
| 7,243,299 | B1 | 7/2007 | Rubin et al. | |
| 7,284,008 | B2 | 10/2007 | Henkin et al. | |
| 7,337,395 | B2 | 2/2008 | Reinhardt et al. | |
| 7,584,165 | B2 * | 9/2009 | Buchan | 706/60 |
| 7,660,793 | B2 | 2/2010 | Indeck et al. | |
| 7,680,324 | B2 | 3/2010 | Boncyk et al. | |
| 7,814,085 | B1 * | 10/2010 | Pfleger et al. | 707/708 |
| 7,870,117 | B1 * | 1/2011 | Rennison | 707/706 |
| 7,881,981 | B2 * | 2/2011 | Taylor et al. | 705/26.1 |
| 7,895,223 | B2 * | 2/2011 | Toebes | 707/758 |
| 7,895,241 | B2 * | 2/2011 | Schoen et al. | 707/802 |
| 2002/0007348 | A1 | 1/2002 | Ali et al. | |
| 2002/0091671 | A1 * | 7/2002 | Prokoph | 707/1 |
| 2002/0107735 | A1 | 8/2002 | Henkin et al. | |
| 2002/0120505 | A1 | 8/2002 | Henkin et al. | |
| 2003/0132934 | A1 | 7/2003 | Fremming | |
| 2003/0163213 | A1 | 8/2003 | Hobbs et al. | |
| 2003/0195872 | A1 | 10/2003 | Senn | |
| 2003/0216897 | A1 | 11/2003 | Endres et al. | |
| 2004/0153437 | A1 | 8/2004 | Buchan | |
| 2004/0216032 | A1 | 10/2004 | Amitay et al. | |
| 2004/0220846 | A1 | 11/2004 | Cullick et al. | |
| 2005/0034056 | A1 | 2/2005 | Rubin et al. | |
| 2005/0060191 | A1 | 3/2005 | Parkins et al. | |
| 2005/0149307 | A1 | 7/2005 | Gurpinar et al. | |
| 2006/0129366 | A1 | 6/2006 | Shaw | |
| 2006/0155699 | A1 | 7/2006 | Purvis et al. | |
| 2006/0184329 | A1 | 8/2006 | Rowan et al. | |
| 2006/0197759 | A1 | 9/2006 | Fremming | |
| 2006/0282784 | A1 | 12/2006 | Taylor et al. | |
| 2007/0112547 | A1 | 5/2007 | Ghorayeb et al. | |
| 2007/0124220 | A1 | 5/2007 | Griggs et al. | |
| 2007/0174275 | A1 | 7/2007 | Kan et al. | |
| 2007/0198516 | A1 | 8/2007 | Ganapathy et al. | |
| 2008/0016059 | A1 | 1/2008 | Henkin et al. | |
| 2008/0016109 | A1 | 1/2008 | Henkin et al. | |
| 2008/0114724 | A1 | 5/2008 | Indeck et al. | |
| 2008/0133550 | A1 * | 6/2008 | Orangi et al. | 707/100 |
| 2008/0172362 | A1 * | 7/2008 | Shacham et al. | 707/3 |
| 2009/0063230 | A1 | 3/2009 | Broussard et al. | |
| 2009/0083251 | A1 * | 3/2009 | Sahasrabudhe et al. | 707/5 |
| 2009/0125367 | A1 * | 5/2009 | Brink et al. | 705/9 |

FOREIGN PATENT DOCUMENTS

| | | |
|---|---|---|
| KR | 20010103149 | 11/2001 |
| WO | 9964896 | 12/1999 |
| WO | 9967698 | 12/1999 |
| WO | 2004049216 | 6/2004 |
| WO | 2005122001 | 12/2005 |

OTHER PUBLICATIONS

Schutz, F., Outer Context: A not yet Discovered Jewel for Document-Based Information Mining (Abstract), From Proceeding 361 Information and Knowledge Sharing, St. Thomas, US Virgin Islands, Nov. 18-20, 2002, 1 page.

Nakajima, S., Kinoshita, S., and Tanaka, K., Context-Dependent Information Exploration, Eleventh International World Wide Web Conference, May 7-11, 2002, 8 pages.

Broder, A., From Query Based information Retrieval to context driven Information Supply, Yahoo! Research, USA, May 20, 2006, 26 pages.

Su, J. and Lee, M., An Exploration in Personalized and Context-Sensitive Search, Proceedings of the 7th annual CLUK research colloquium, Birmingham, England, Jan. 6-7, 2004, 8 pages.

Shen, X., Tan, B., and Zhai, C. X., UCAIR: Capturing and Exploiting Context for Personalized Search, Proceedings of the ACM SIGIR 2005 Workshop on Information Retrieval in Context (IRiX), Salvador, Brazil, Aug. 19, 2005, 3 pages.

Graupmann, J. and Schenkel, R., GeoSpehereSearch: Context-Aware Geographic Web Search, Proceedings of the 3rd ACM Workshop on Geographic Information Retrieval, Seattle, Washington, USA, Aug. 10, 2006, 4 pages.

2006 KM Guide, IDM's Knowledge Management Guide for 2006, Image and Data Manager Online, Asia Pacific's Online Resource for Information Management, Australia, 2007, 6 pages.

International Search Report of PCT Application No. PCT/US2008/074502 dated Mar. 30, 2009.

Examination Report of GB Application No. 1000268.1 dated Aug. 1, 2011.

Cosijn, Erica and Peter Ingwersen, "Dimensions of relevance," Information Processing and Management, 2000, vol. 36: pp. 533-550.

The site of TerraFly, Jun. 24, 2007, Miami, Florida, <http://terrafly.fiu.edu/>.

The site of TerraFly GeoQuery, Jun. 24, 2007, <http://vn4.cs.fiu.edu/cgi-bin/arquery.cgi?vid=&y1=35.401756&x1=-96.202507&category=newgnis&arcriteria=1&anyfield=Oil+Field&submit.x=53&submit.y=15>.

US 7,310,640, 12/2007, Purvis et al. (withdrawn)

* cited by examiner

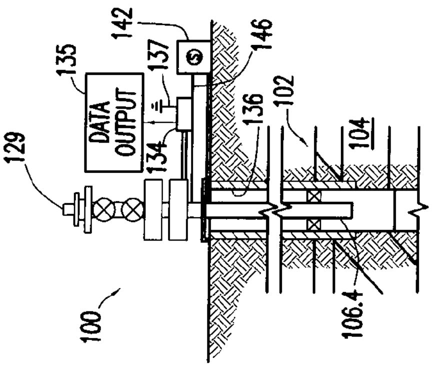
FIG. 1.4
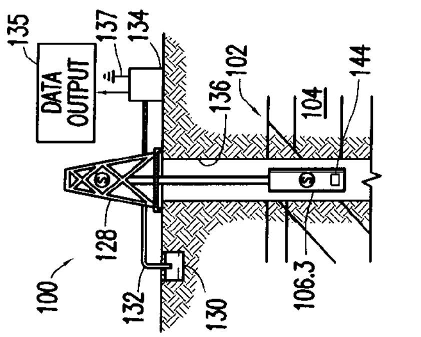
FIG. 1.3
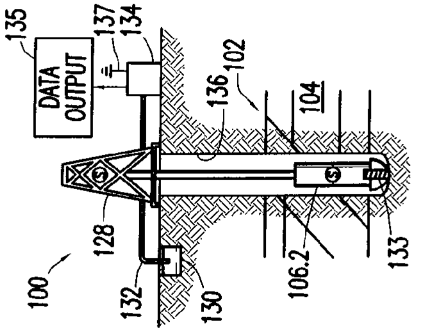
FIG. 1.2
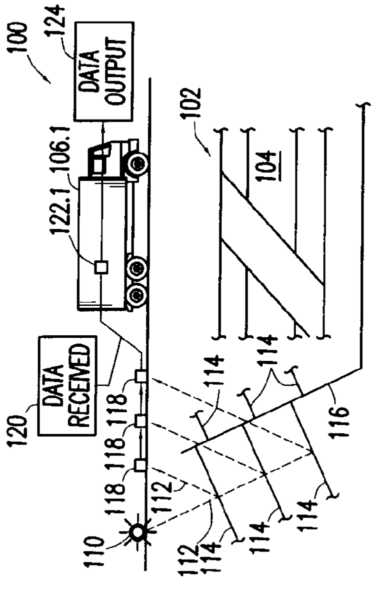
FIG. 1.1
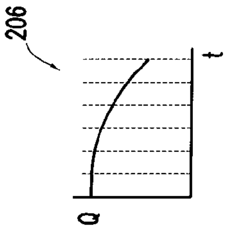
FIG. 2.4
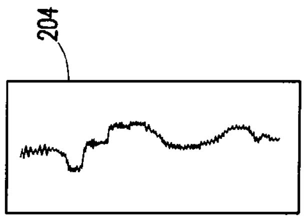
FIG. 2.3
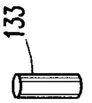
FIG. 2.2
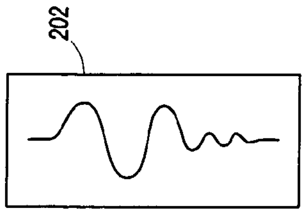
FIG. 2.1

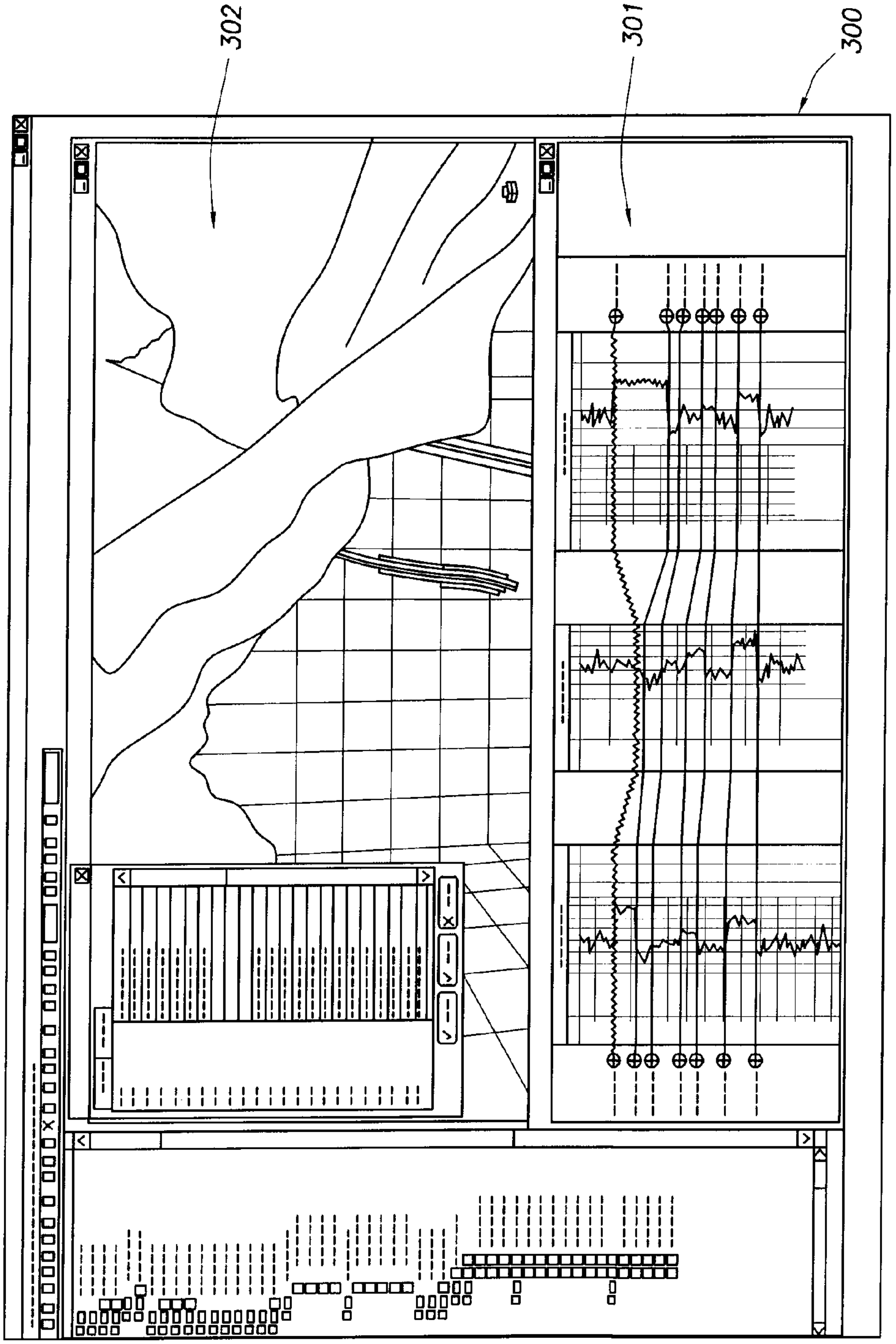
FIG.3.1

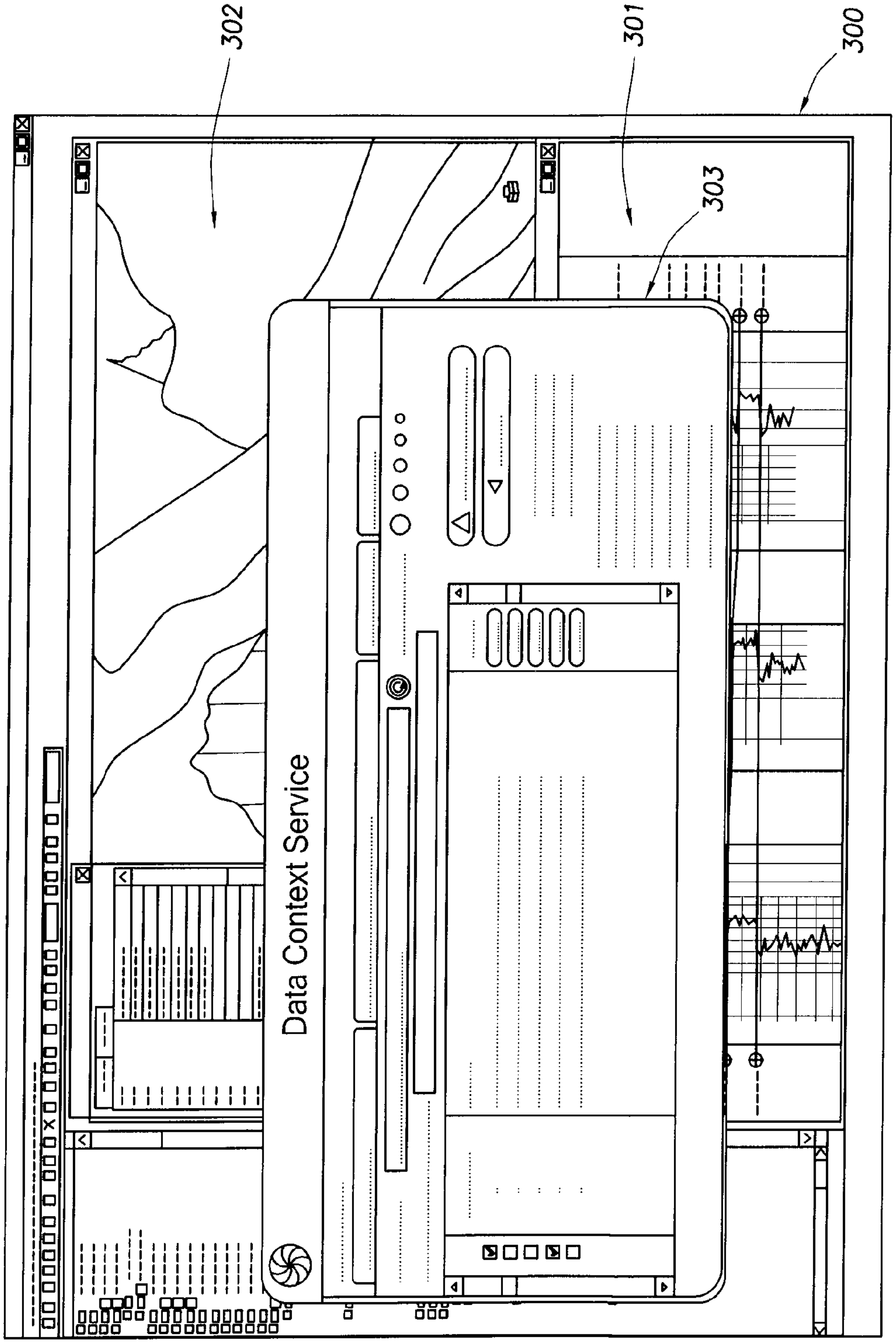
FIG.3.2

QUALITY MEASURE FOR A DATA CONTEXT SERVICE

CROSS REFERENCE TO RELATED APPLICATIONS

This Application is a Continuation-in-Part of and claims priority under 35 U.S.C. §120 to U.S. patent application Ser. No. 12/198,780, filed Aug. 26, 2008, entitled "METHOD AND SYSTEM FOR DATA CONTEXT SERVICE," which is incorporated herein by reference in its entirety and claims priority under 35 U.S.C. §119(e) to Provisional Patent Application No. 60/968,304 filed Aug. 27, 2007.

BACKGROUND

Oilfield operations, such as surveying, drilling, wireline testing, completions, production, planning and oilfield analysis, are typically performed to locate and gather valuable downhole fluids. During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure, and geological stratigraphy that define the geological structures of the subterranean formation. Dynamic data relates to, for example, fluids flowing through the geologic structures of the subterranean formation over time. Such static and/or dynamic data may be collected to learn more about the formations and the valuable assets contained therein.

The data may be used to predict downhole conditions, and make decisions concerning oilfield operations. Such decisions may involve well planning, well targeting, well completions, operating levels, production rates and other operations and/or operating parameters. Often this information is used to determine when to drill new wells, re-complete existing wells, or alter wellbore production. Oilfield conditions, such as geological, geophysical and reservoir engineering characteristics may have an impact on oilfield operations, such as risk analysis, economic valuation, and mechanical considerations for the production of subsurface reservoirs.

Data from one or more wellbores may be analyzed to plan or predict various outcomes at a given wellbore. In some cases, the data from neighboring wellbores or wellbores with similar conditions or equipment may be used to predict how a well may perform. Usually, a large number of variables and large quantities of data may be used in an oilfield project to consider in analyzing oilfield operations. It is, therefore, often useful to model the behavior of the oilfield operation using an oilfield software application to perform a workflow to determine the desired course of action. During the ongoing operations, the operating parameters may be adjusted as oilfield conditions change and new information is received.

Workers seeking knowledge in the energy industry typically have access to a domain of structured information (data in databases or spreadsheets) and very limited access to unstructured data (reports, presentations, maps, emails, web content, etc. described above). Various studies indicate approximately twenty percent of data used in most businesses are structured data with the remaining eighty percent being unstructured data commonly appearing in memos, notes, news, user groups, chats, reports, letters, surveys, white papers, marketing material, research, presentations and Web pages. In energy (e.g., oil and gas, renewable energies, etc.) industry, more than sixty percent of unstructured data are not managed or used. If the worker uses common search tools for unstructured data such as web content search engines or Electronic Document Management Systems (EDMS) for searching documents and reports, the search results are often unusable because the taxonomy of the search is not relevant to the domain and workflow of the energy industry.

SUMMARY

In general, in one aspect, the invention relates to a method for providing a data context service. The method comprises extracting context information from a host application associated with an oilfield project, the context information comprising a current state of a user in the host application, sorting the context information into a plurality of dimensions of relevance, generating a search profile for each of the plurality of dimensions of relevance, requesting a first plurality of searches using at least the search profile, receiving a plurality of oilfield data items resulting from the first plurality of searches, obtaining a quality measure of an oilfield data item of the plurality of oilfield data items based on a pre-determined quality criterion, sending the oilfield data item as a search result to the host application after determining the quality measure exceeds a pre-determined threshold, and generating an output using the host application based on the search result, the output being used to perform an oilfield operation.

Other aspects of the quality measure for data context service will be apparent from the following description and the appended claims.

BRIEF DESCRIPTION OF DRAWINGS

So that the above recited features of the quality measure for data context service can be understood in detail, a more particular description, briefly summarized above, may be had by reference to the embodiments thereof that are illustrated in the appended drawings. It is to be noted, however, that the appended drawings illustrate only typical embodiments of the quality measure for data context service and are therefore not to be considered limiting of its scope, for the quality measure for data context service may admit to other equally effective embodiments.

FIGS. 1.1-1.4 depict a schematic view of an oilfield having subterranean structures containing reservoirs therein, in which embodiments of the quality measure for data context service can be implemented.

FIGS. 2.1-2.4 depict graphical depictions of data collected by the tools of FIGS. 1.1-1.4, respectively.

FIG. 3.1 depicts an example display of a user application used by an oilfield operation project.

FIG. 3.2 depicts an example display of a user application with a data context service window.

DETAILED DESCRIPTION

Figure 4:
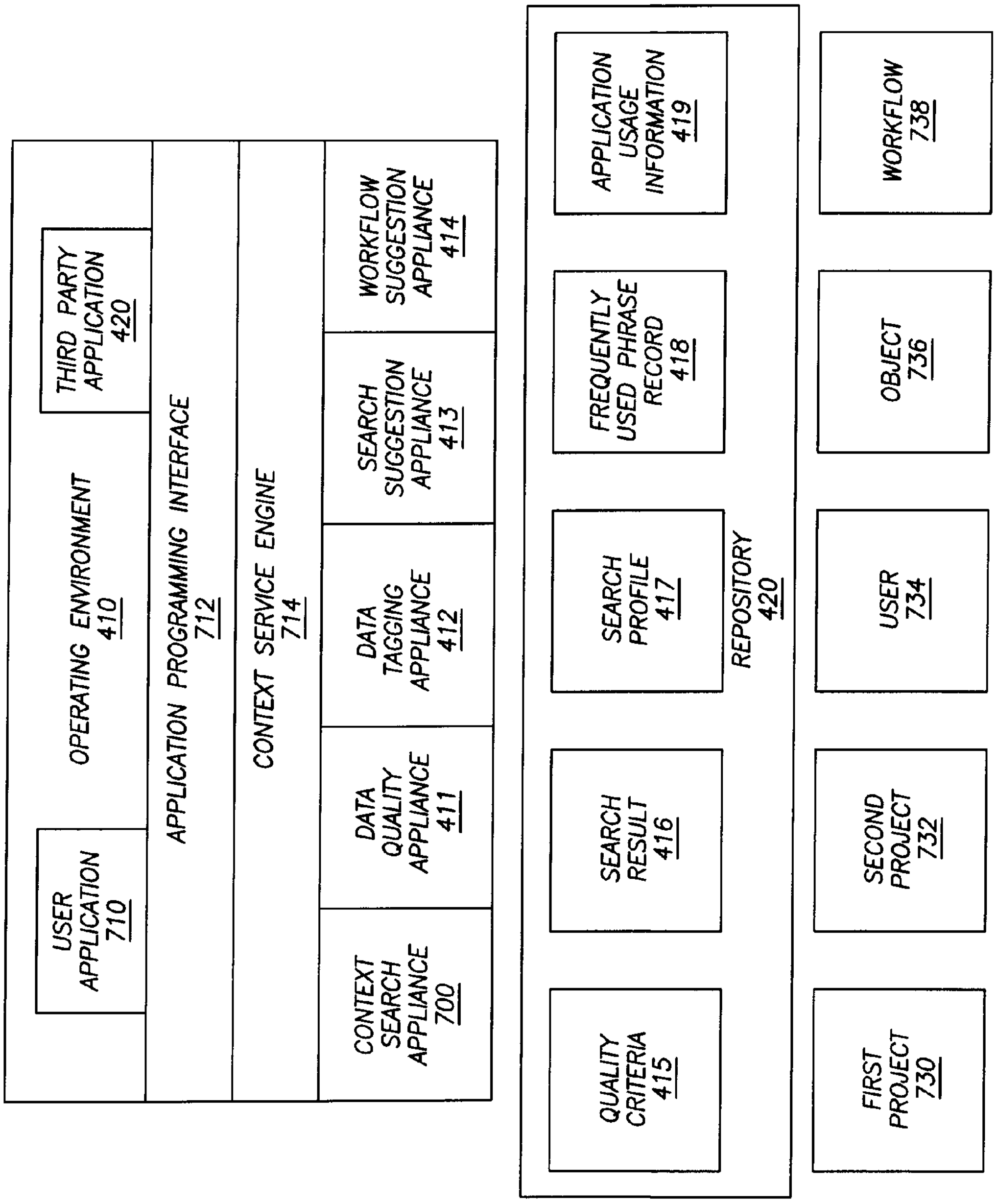
FIG. 4 depicts an example schematic diagram of using the data context service in performing an oilfield operation.

Embodiments of the data context service are shown in the above-identified figures and described in detail below. In describing the embodiments, like or identical reference numerals are used to identify common or similar elements. The figures are not necessarily to scale and certain features and certain views of the figures may be shown exaggerated in scale or in schematic in the interest of clarity and conciseness.

In general, embodiments of the data context service provide capabilities of performing searches of the oilfield data having both structured and unstructured formats from within an oilfield software application, and to return search results that are more relevant to the context of the oilfield project, the application used by the project, the workflow performed using the application, the user using the application, etc. In addition, embodiments of the data context service include capabilities for identifying the quality of the search results, promoting search results with good quality, and cleaning up poor quality results. Furthermore, embodiments of the data context service include capabilities for providing suggestions to assist the user in performing searches of oilfield data that is more relevant to the context.

FIGS. 1.1-1.4 show a schematic view of an oilfield having subterranean structures containing reservoirs therein, with various oilfield operations being performed on the oilfield.

FIG. 1.1 depicts a survey operation being performed to generate a seismic data output record (124) using recording truck computer (122.1) on a seismic recording truck (106.1) to receive, via geophone-receivers (118), data (120) of sound vibration(s) (112) that reflect off horizons (114) in an earth formation (116) from an acoustic source (110).

FIG. 1.2 depicts a drilling operation being performed by a drilling tool (106.2) suspended by a rig (128) and advanced into the subterranean formation (102) to form a wellbore (136) for reaching the reservoir (104). Drilling mud is circulated through the drilling tool (106.2) via a flow line (132) back to a mud pit (130) on the surface. The drilling tool may be adapted for measuring downhole properties such as adapted for taking a core sample (133). A surface unit (134) with a transceiver (137) collects data output (135) generated during the drilling operation and allows communications between various portions of the oilfield (100) or other locations.

FIG. 1.3 depicts a wireline operation and includes all the elements depicted in FIG. 1.2 except that the drilling tool (106.2) is substituted with a wireline tool (106.3) adapted for performing well logs, downhole tests, collecting samples, and/or performing a seismic survey operation based on an explosive or acoustic energy source (144) in which case the wireline tool (106.3) may provide data output (135) to the surface unit (134).

FIG. 1.4 depicts a production operation being performed by a production tool (106.4) deployed from a production unit or christmas tree (129) and into the completed wellbore (136) of FIG. 1.3 for drawing fluid from the downhole reservoirs (104) into surface facilities (142) via a gathering network (146). Sensors (S) positioned about the oilfield (100) are operatively connected to a surface unit (134) with a transceiver (137) for collecting data (135), for example, reservoir data, wellbore data, surface data and/or process data.

While one wellsite is shown, it will be appreciated that the oilfield (100) may cover a portion of land that hosts one or more wellsites. Part, or all, of the oilfield may be on land and/or sea. Also, the oilfield operations depicted in FIGS. 1.1-1.4 may be performed with any combination of one or more oilfields, one or more processing facilities and one or more wellsites.

FIGS. 2.1-2.4 show graphical depictions of data collected by the tools of FIGS. 1.1-1.4, respectively. FIG. 2.1 depicts a seismic trace (202) of the subterranean formation (102) of FIG. 1.1 taken by survey tool (106.1). FIG. 2.2 depicts a core sample (133) taken by the logging tool (106.2) of FIG. 1.2. FIG. 2.3 depicts a well log (204) of the subterranean formation (102) taken by the wireline tool (106.3) of FIG. 1.3. FIG. 2.4 depicts a production decline curve (206) of fluid flowing through the subterranean formation (102) taken by the production tool (106.4) of FIG. 1.4.

FIG. 3.1 shows an example display of an oilfield software application (referred to as a user application or a host application) (300) used by an oilfield project in accordance with one or more embodiments of the data context service. The host application (300) may be a simulator (e.g., a wellsite simulator, a non-wellsite simulator) or any other software application used by the oilfield project. For example, the host application (300) may be used to model drilling operations for an oilfield project. Further, operations in the oilfield project may involve actions (e.g., search, quality control, data tagging, or any other available functions) performed within the host application itself, performed in the environment of the host application, as well as performed in other third party applications co-existing with the host application in the environment of the host application. For example, the host application may be an application executing within an operating system and interacting with one or more third party applications within the operating system. In addition, operations in the oilfield project may involve a workflow (i.e., an ordered sequence of operations) that includes various actions described above executing on a computer system with a processor (e.g., a central processing unit). In such environments, one or more workflow states may be defined based on the current action and history of actions within the host application itself, within the environment of the host application, within other third party applications interacting with the host application, or otherwise within the workflow.

Initially, the term "context" points to the part of a text or statement that surrounds a particular word or passage and determines the meaning of the part. In general, the term "context" describes a setting or circumstances in which an event occurs. For example, the event may be a search or other access to oilfield data while the setting or circumstances (referred to as the current state) may relate to aspects of performing oilfield operations, such as the identity or profile of a user, an asset/project location, aspects of oilfield data with which the user is working, aspects of oilfield software application (e.g., the host application (300)) and oilfield workflow used in the project (e.g., the one or more workflow states described above), etc. Details of these aspects are described with respect to FIG. 4 below. The current state may also be referred to as the current state of the user. In one or more embodiments, the context information may be categorized into context information categories according to these aspects. These context information categories may be referred to as dimensions of relevance.

As shown in FIG. 3.1, the host application (300) may include a three dimensional (3D) display (302), which depicts a wellbore penetrating a subterranean formation for extracting fluid from an underground reservoir. The host application (300) may also include a data log (301) showing various geophysical parameters obtained from various sensors disposed about the wellbore, the subterranean formation, the underground reservoir, or any other portion of the oilfield. In one or more embodiments, the host application (300) may be a geoscience application executing on a computer system and used for reservoir engineering where a user (e.g., a geoscientist) may need to verify information from the data log (301) by searching or otherwise accessing different sources of data (not shown). The host application (300) is commonly stored on a computer readable medium containing instructions for executing on a computer system.

FIG. 3.2 shows a data context service window (303) launched from and displayed within the host application (300) (or associated environments, as discussed above) in accordance with one or more embodiments of the data context service. The data context service window (303) may present the results (i.e., oilfield data items such as data entry from a database or other relevant documents, files, reports, web content, etc.) from various searches performed based on context information extracted from the host application (300) in the form of one or more search profiles. The data context service window (303) may be activated from within the host application (300) so that the search results may be applied within the host application (300) directly. The activation may be performed manually or automatically based on certain conditions detected within the host application (300). Details of the data context service window (303) are provided below.

FIG. 4 shows an example schematic diagram of the data context service in performing the oilfield operation in accordance with one or more embodiments. FIG. 4 includes a user application (i.e., host application) (710), an operating environment (410), a third party application (420), an application programming interface (712), a context service engine (714), multiple appliances (700), (411)-(414), a repository (420), first and second projects (730, 732), a user (734), an oilfield object (736), and a workflow (738). Further, the repository (420) is shown to store quality criteria (415), search result (416), search profile (417), frequently used phrase record (418), and application usage information (419).

The host application (710) may correspond to the host application (300) as discussed with respect to FIGS. 3.1 and 3.2 above. The host application (710) may be used by the user (734) in the oilfield project (730, 732) as part of a workflow, such as the workflow (738). As discussed above, the setting may include the host application (710) executing within the operating environment (410) and interacting with one or more third party application (420) within the operating environment (410). Furthermore, the workflow (738) may include multiple actions performed within the applications (710, 420) and the operating environment (410) executed in a pre-determined order to perform the oilfield operation associated with the oilfield project (730, 732).

In one or more embodiments, the context service engine (714) may be configured to extract context information from the current state of the user (734) in the setting described above. In one or more embodiments, the context information may be extracted from the host application (710) via the application programming interface (712). In one or more embodiments, the context information may also be extracted from the operating environment (410) or the third party application (420) via the application programming interface (712). In one or more embodiments, the extracted context information may be modified by the user (734).

In one or more embodiments, the context service engine (714) may be configured with search engine functionality. In one or more embodiments, the context service engine (714) may be configured to work with a third party application (e.g., 420) having search engine functionality. For example, the third party application (420) may correspond to a search engine application. The search engine functionality may include search engine indexing that collects, parses, and stores data to facilitate fast and accurate information retrieval. In one or more embodiments, the context service engine (714) may be configured to use search indexes stored locally. Further, the context service engine (714) may be configured to use search indexes from other services such as the third party application (420).

In one or more embodiments, the application programming interface (712) may provide functionality to configure and activate the context service engine (714) from a launch point within the host application (710) to obtain search results (416), where the search results are obtained using the search engine functionality based on extracted context information described above. Based on the location of the execution of the context service engine (714) within the host application (710), the context may change accordingly. In one or more embodiments, the application programming interface (712) may provide functionality to allow the context service engine (714) to access third party search engine functionality or third party search index from the third party application (420). In one or more embodiments, the application programming interface (712) may provide functionality to allow the context service engine (714) to send search results (416) to the third party application (420).

As shown in FIG. 4, the workflow (738) may be a current workflow being executed in the associated host application (710) or a previous workflow of the project (730, 732) completed in the past. The workflow (738) may be associated with a workflow name, a role of the workflow, and a workflow date. The workflow date may relate to a date when the workflow (738) is performed. The user (734) may be a member of the project (730, 732) and be associated with a title and/or role for the project.

In addition, the project (730, 732) may be associated with a project name, a role of the project, a project location, a project date, and/or an object such as the object (736). The project date may relate to a starting date, a current date, and/or a scheduled date of the oilfield operation. The object (736) may be a wellbore, a subterranean formation, an underground reservoir, or any other portion of an oilfield, such as those discussed with respect to FIGS. 3.1 and 3.2 above. The object (736) may be associated with an object location, an object date, an object name, a serial number, or other identifications of the object. The object date may relate to an event associated with the object (736) such as a date of geological survey, drilling, completion, production, etc.

Further as shown in FIG. 4, the context service engine (714) may be coupled to multiple appliances, such as the context search appliance (700), data quality appliance (411), data tagging appliance (412), search suggestion appliance (413), and workflow suggestion appliance (414), etc. The context search appliance (700) may represent any one of the spatial context appliance, the object context appliance, the profile context appliance, the analog context appliance, the time frame context appliance, or combinations thereof, as described in the parent U.S. patent application Ser. No. 12/198,780, which is incorporated herein in its entirety. Although not specifically shown in FIG. 4, any number of these context search appliances described above may be coupled to the context service engine (714).

In one or more embodiments, the context search appliance (700) and the data quality appliance (411) may be configured to provide functionality for obtaining search results (416) based on the spatial context, the object context, profile context, analog context, time frame context, quality criteria, or combinations thereof. In one or more embodiments, other appliances (412, 413, 414) may be configured to provide functionality to assist in obtaining search results (416) by providing suggestions to the user (734). One or more search profile (417) may be generated for these context search appliances, such as the spatial context search profile, the object context search profile, the profile context search profile, the analog context search profile, and the time frame context search profile described below.

In one or more embodiments, the context search appliance (700) is configured as the spatial context appliance and may obtain search results (416) by evaluating geographical proximity of a search candidate (with both structured and unstructured formats) with respect to a location of interest. The evaluation may be performed as a distance ranking using a computer heuristic. In one or more embodiments, the spatial context appliance generates the spatial context search profile to be used in conjunction with the search engine functionality associated with the context service engine (714) to obtain the search results (416). In one or more embodiments, a relevance score of the search results (416) may be generated based on the spatial context search profile. Details of the spatial context appliance are described with respect to FIG. 6 below.

In one or more embodiments, the context search appliance (700) is configured as the object context appliance and may obtain search results (416) by evaluating a relevance measure of a search candidate (with both structured and unstructured formats) with respect to a name, a serial number, or an identification of a wellsite, a wellbore, a process facility, a portion of the subterranean formation, a portion of the reservoir, or any other portion of the oilfield. In one example, the evaluation may be performed as a word pattern matched ranking using a computer heuristic. In one or more embodiments, the object context appliance generates the object context search profile to be used in conjunction with the search engine functionality associated with the context service engine (714) to obtain the search results (416). In one or more embodiments, a relevance score of the search results (416) may be generated based on the object context search profile.

In one or more embodiments, the context search appliance (700) is configured as the profile context appliance and may obtain search results (416) by evaluating a relevance measure of a search candidate (with both structured and unstructured formats) with respect to a name of the project, a role of the project, a name of the workflow, a role of the workflow, a title of the user, a role of the user, a name of the host application, or a role of the host application. The evaluation may be performed as a word pattern matching of names (e.g., of the project, the workflow, or the host application) in conjunction with a pre-determined relationship associated with a user title or roles (e.g., of the project, the workflow, the user, or the host application) using a computer heuristic. For example, a title "geophysicist" may be associated using a pre-determined relationship with a search candidate (with both structured and unstructured formats) having the word pattern "geophysical survey report" in a title, content, or other attribute of the search candidate (with both structured and unstructured formats) to yield a high relevance measure. The profile context appliance also has the ability to identify and display the most relevant results for the given profile based on usage statistics (e.g., 419) performed on the collected information (e.g., 416). In other words, the "favorites" information of users having the same profile is displayed. In one or more embodiments, the profile context appliance generates and/or stores the profile context search profile to be used in conjunction with the search engine functionality associated with the context service engine (714) to obtain the search results (416). In one or more embodiments, a relevance score of the search results (416) may be generated and/or stored based on the profile context search profile.

In one or more embodiments, the context search appliance (700) is configured as the analog context appliance and may obtain search results (416) by evaluating a relevance measure of a search candidate (with both structured and unstructured formats) with respect to a characteristic or attribute of data used in the host application (710) or the workflow (738). The evaluation may be performed by comparing the similarity between the host application data and data associated with a search candidate (with both structured and unstructured formats) using a computer heuristic. For example, the host application (710) may be a reservoir simulator calculating flow rate data and may be associated with a search candidate (with both structured and unstructured formats) having similar data to yield a high relevance measure. In one or more embodiments, the analog context appliance generates and/or stores the analog context search profile to be used in conjunction with the search engine functionality associated with the context service engine (714) to obtain the search results (416). In one or more embodiments, a relevance score of the search results (416) may be generated and/or stored based on the analog context search profile.

In one or more embodiments, the context search appliance (700) is configured as the time frame context appliance and may obtain search results (416) by evaluating temporal proximity of a search candidate (with both structured and unstructured formats) with respect to, for example, a project date, a workflow date, or an object date. The evaluation may be performed using a computer heuristic to identify any date related information associated with the search candidate (with both structured and unstructured formats) and compare it to, for example, the project date, the workflow date, or the object date. The date related information may be extracted from a title, content, time stamp, or other attributes associated with the search candidate (with both structured and unstructured formats). In one or more embodiments, the time frame context appliance generates and stores the time frame context search profile to be used in conjunction with the search engine functionality associated with the context service engine (714) to obtain the search results (416). In one or more embodiments, a relevance score of the search results (416) may be generated and stored based on the time frame context search profile.

In one or more embodiments, the data quality appliance (411) may be configured to provide functionality for obtaining search results (416) based on a quality measure. The quality measure may include various quality criteria (415) such as completeness, consistency, validity, uniqueness, etc. Completeness may correspond to the degree that the oilfield data item in the search results (416) includes all required attributes. For example, the oilfield data item may be a well and the attributes may include a name, a serial number, a location, a drilling date, etc. The consistency may correspond to the degree that the attributes of the oilfield data item in the search results (416) are consistent across different data sources. For example, the oilfield data item may be obtained from a database, a spreadsheet, a report, a website, etc. The validity may correspond to the degree that the attributes of the oilfield data item are correct, internally consistent, and fulfill standards compliance. For example, the validity quality measure may be associated with a pre-determined verification procedure. The uniqueness may correspond to the degree that a value of an attribute uniquely defines a specific oilfield data item. For example, each well name should uniquely identify a specific well. In one or more embodiments, the various quality criteria (415) of the quality measure may be user selected.

In one or more embodiments, when the data quality appliance (411) is activated, the search mechanism of the context service engine (714) combines the selected quality criteria (415) and one or more search profile (417) associated with the context search appliances. For example, the context service engine (714) obtains search results (416) using associated search engine functionality according to the various search profiles (417) described above. Quality measures of these search results (416) may then be obtained by the data quality appliance (411) according to the selected quality criteria (415). Furthermore, the relevance score of these search results (416) may be adjusted based on the quality measures. In one or more embodiments, portions of search results (416) with poor quality may be eliminated if the associated quality measure falls below a pre-determined threshold. In one or more embodiments, the quality measure is obtained by the data quality appliance (411) from a third party data quality engine (not shown) and the quality criterion is selected by the user from quality criteria provided by the third party data quality engine. An example of using the quality criteria (415) in combination with the search profiles (417) is described with respect to FIG. 8 below.

In one or more embodiments, a tag cloud is a visual depiction of tags with corresponding weights reflecting the importance of each tag. Tags are usually single words and are typically listed alphabetically in the tag cloud with the importance of a tag expressed based on font size and/or color, allowing a tag to be found alphabetically or by its importance. In one or more embodiments, the data tagging appliance (412) may be configured to generate the frequently used phrase record (418) based on search results (416) from various searches performed by the context service engine (714) in an accumulative manner. In one or more embodiments, the data tagging appliance (412) may be configured to organize the frequently used phrase record (418) based on context information associated with the various searches performed by the context service engine (714). In one or more embodiments, the data tagging appliance (412) may be configured to generate a tag cloud from a current search result obtained each time a search is performed by the context service engine (714), where the weight of each tag is determined based on the tag's appearance in the frequently used phrase record (418). When the user (734) selects one of the tags in the tag cloud upon reviewing the current search result, the selected tag may be added as an additional search constraint to be combined with the search profiles (417) for performing a new search to refine the current search result. In one or more embodiments, the data tagging functionality may be integrated within the context service engine (714) without the separate data tagging appliance (412). An example of the tag cloud is described with respect to FIG. 7 below.

In one or more embodiments, the search suggestion appliance (413) may be configured to provide one or more suggestions to assist the user (734) in selecting efficient search criteria based on the context information extracted from the current state of the user (734) as well as application usage information (419) maintained by the search suggestion appliance (413). For example, the suggestion may be in the form of auto-completion of keywords, keyword suggestions, or search profile suggestions. Details of the suggestions provided by the search suggestion appliance (413) are described with respect to the examples depicted in FIGS. 7 and 8 below.

In one or more embodiments, the workflow suggestion appliance (414) may be configured to provide predictive analysis and suggestions for future workflow steps, decisions, and processes to the user (734) based on the context information extracted from the current state of the user (734) as well as application usage information (419) maintained by the workflow suggestion appliance (414). In one or more embodiments, the workflow suggestion appliance (414) may be configured to maintain (e.g., capture, accumulate, update, or otherwise manage) the application usage information (419), such as relevant statistics and patterns of user interaction with an oilfield asset model (e.g., modeling a well, wellsite, processing facility, or other oilfield objects). For example, the user interaction with the oilfield asset model may include information relating to the workflows and/or decisions, outcomes of the workflows and/or decisions, data used in the workflow and/or decisions and correlations in user interaction with the data, searches performed with corresponding frequencies, etc.

In one or more embodiments, the context service engine (714) coupled with the workflow suggestion appliance (414) may be integrated with a smart workflow system (not shown) to assist, capture, and track individual workflow processes in the smart workflow system by providing discussion and decision tracking among multiple users of related oilfield projects.

In one or more embodiments, one or more of the appliances (e.g., 700, 411-414) may be combined into a generic system that performs the functionality of one or more of the appliances as a single system. Further, one or more appliances may be combined, substituted or not included. Combination of selected appliances may be configured, and the configuration may be performed statically, dynamically, or by selection of the user (734). For example, the search suggestion appliance (413) and/or the workflow suggestion appliance (414) may be combined with the profile context appliance as one context appliance.

Figure 5:
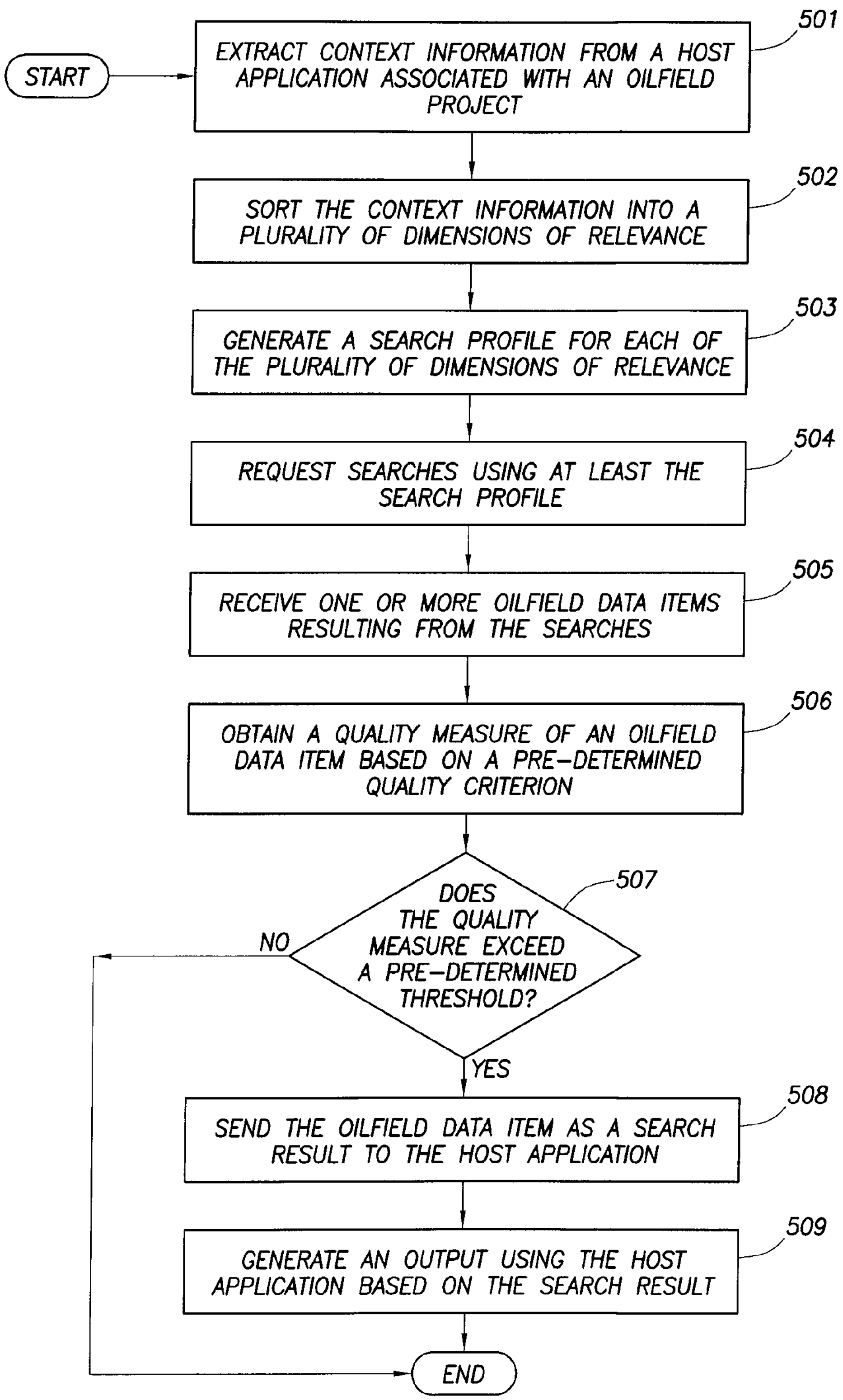
FIG. 5 depicts a flowchart depicting a method of using the data context service in performing an oilfield operation.

FIG. 5 is a flowchart depicting a method of using the data context service from within a host/user application to perform the oilfield operation in accordance with one or more embodiments. In one or more embodiments, one or more of the portions shown in FIG. 5 may be omitted, repeated, and/or performed in a different order. Accordingly, embodiments of the data context service should not be considered limited to the specific arrangements of the method shown in FIG. 5.

In one or more embodiments, the method depicted in FIG. 5 may be practiced using the system described with respect to FIG. 4 above. As described, the oilfield operation may be performed in a workflow of a project using a host application. Initially, the context information associated with the project is extracted from the host application (Element 501). The context information may relate to spatial information associated with the oilfield project, a workflow associated with the oilfield project, an oilfield object associated with the oilfield project, a time frame associated with the oilfield project, an analog context associated with the oilfield project, a user role in the oilfield project, etc. The extracted context information is sorted into multiple dimensions of relevance) (i.e., context information categories described with respect to FIG. 3.1 above) (Element 502). Then, search profiles are generated from the multiple dimensions of relevance (Element 503). A separate search profile may be generated from each of the dimensions of relevance. A search profile may provide some portion of the search criteria based on which a search for oilfield data items may be performed. The effects of the multiple search profiles may be combined according to a weighted average scheme where the weighting of individual search profiles may be determined based on user input. Optionally, application usage information from multiple users of the host application may be obtained so that an optional suggested search phrase may be generated by correlating the context information to the application usage information.

In Element 504, multiple searches are requested based on at least the search profile. The searches may be further limited by an optional search phrase. Optionally, the searches may be based on a third party search index. In Element 505, one or more oilfield data items (of structured and/or unstructured formats) are received as results from the multiple searches. Optionally, the results may be sent to a third party application.

Upon receipt of the results, a quality measure of an oilfield data item included in the results may be obtained based on pre-determined quality criteria (Element 506). Optionally, one or more phrases may be identified from the oilfield data item, each phrase associated with a corresponding usage measure based on a record of frequently used phrases. For example, the usage measure may be generated from searches performed by multiple users of the host application. A phrase may then be selected, for example, by the user as a search keyword from the one or more phrases based on the corresponding usage measure. Accordingly, additional searches may be requested to refine the result by limiting the searches with the search keyword in addition to using the search profile. If the quality measure exceeds a pre-determined threshold (Element 507), then the oilfield data item is sent to the host application as a search result (Element 508). Otherwise, if the quality measure does not exceed the pre-determined threshold (Element 507), then the process may end or continue until the quality measure exceeds the pre-determined threshold. In Element 509, an output may be generated using the host application based on the search result, and the oilfield operation (e.g., a survey operation, a drilling operation, a simulator operation, and a processing operation, etc.) is adjusted based on the output. In one or more embodiments, the output is stored (e.g., in a repository or other readable storage medium) and the oilfield operation (e.g., a survey operation, a drilling operation, a simulator operation, and a processing operation, etc.) is adjusted based on the output stored in the repository.

The elements of portions or all of the process may be repeated as desired. Repeated elements may be selectively performed until satisfactory results are achieved. For example, elements may be repeated after adjustments are performed. In this example, the repeated elements may be performed to improve the relevance measure of the search results and/or to determine the impact of changes made.

Figure 6:
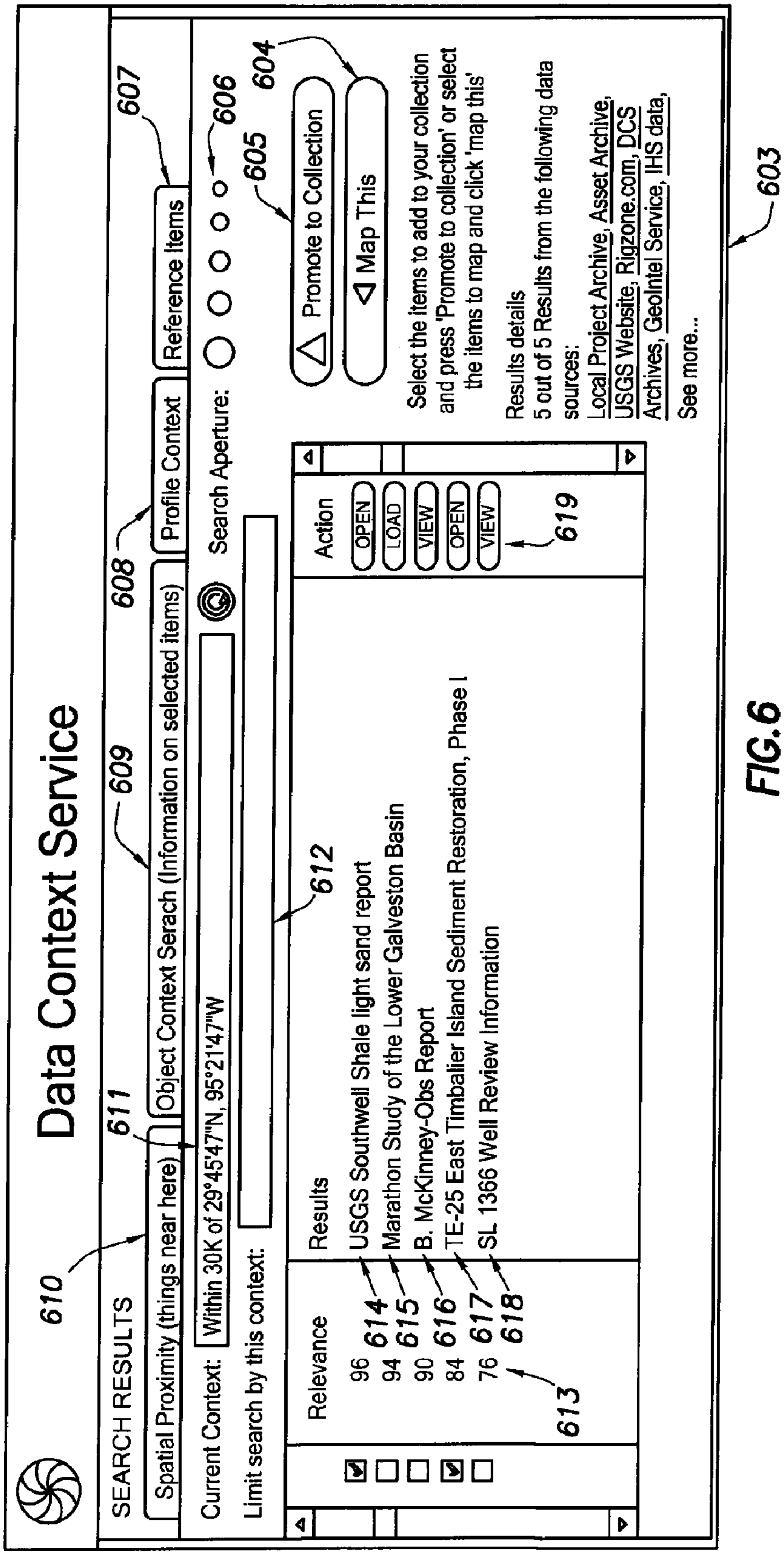
FIG. 6 depicts an example display of a data context service window.

FIG. 6 shows the data context service window (603) in accordance with one or more embodiments. The data context service window (603) displays various search results that are organized into multiple pages. Each page may be retrieved using an associated tab. As shown, FIG. 6 includes the spatial context search result page (610), the object context search result page (609), the profile context search result page (608), and the analog context search result page (607). Each of these pages includes search results obtained using the spatial context appliance, the object context appliance, the profile context appliance, and the analog context appliance, respectively.

For example, the search results presented in the spatial context search result page (610) include search results titled "USGS Southwell Shale light sand report" (614), "Marathon Study of the Lower Galveston Basin" (615), "B. McKinney—Obs Report" (616), "TE-25 East Timballer Island Sediment Restoration, Phase 1" (617), and "SL 1366 Well Review Information" (618). These search results are obtained based on a current context "Within 30 k of 29°45'47"N, 95°21'47"W" shown in the current context field (611), which describes a geographical region within a 30 kilometer distance from a location of interest specified as "29°45'47"N, 95°21'47"W". The location of interest may be the project location, the object location, or other location of interest within the oilfield operation project. Each of the search results (614)-(618) is obtained based on the current context due to at least one associated geographical location falling into the geographical region centered on the location of interest. Each search candidate may be selected because the geographical location is tied to the title, the context, or another aspect of the search candidate.

The spatial context search result page (610) also includes relevance measure (613) (e.g., relevance scores of 96, 94, 90, 84, 76) and an action item (619) (e.g., open, load, view) for each of the search results. The relevance measure (613) may be a measure of geographical proximity of the associated geographical location to the location of interest. The scope of the search may be configured by the search aperture (606). For example, the distance of 30 kilometer may be adjusted based on different settings of the search aperture (606).

As shown in FIG. 6, action items (619) for each of the search results may be presented as selectable options for the user. For example, the search results (614) and (617) are depicted with an "OPEN" action, the search results (616) and (618) are depicted with a "VIEW" action, and the search result (615) is shown with a "LOAD" action. In another example, more than one available action may be selected for a search result. Although the action items depicted in FIG. 6 only include open, load, and view actions, those skilled in the art will recognize that other action items may be implemented for acting on the selected results. For example, a selected result may be saved as spreadsheet file, text file, Keyhole Markup Language (KML) file, Extensible Markup Language (XML) file, or other applicable formats. In another example, a selected result may be sent to an email recipient.

In one or more embodiments, interfaces (e.g., implemented via the application programming interface (714) of FIG. 4) between the host application (710 of FIG. 4) and the context service engine (714 of FIG. 4) may be defined for operations such as view, load, save, send to and open. "Send to" refers to the ability to gather all pertinent information related to selected data items and providing the information to a target application interface via a menu, at which point the information is reformatted and appropriately used by the target application. Various implementations of these interfaces can then be registered with the host application (710 of FIG. 4) and may appear as options in the user interface, for example as depicted in FIG. 6. If the user selects one of these options (e.g., view, load, save, send to, and open), the host application (710 of FIG. 4) extracts the selected data from the current search result set and activates the registered implementation of the interface with the selected data. The implementation may then perform the desired operation (e.g., 'Save' to or 'Send to' a desired file format, etc.).

In one or more embodiments, each of the search results (614)-(618) may be selected for further actions, which may be activated by the action buttons (604) or (605). For example, the search results (614) and (617) are shown as being selected by the check marks next to the relevance scores of the relevance measure (613). In this example, the further actions may be a mapping function (604) or an archiving function (605). In one or more embodiments, the archiving function may be used for designating the search results to a "shared" status for collaboration. Although only two action buttons are illustrated in FIG. 6, those skilled in the art will recognize any number of action buttons or other user interface mechanism (e.g., clicking the right mouse button) may be implemented for providing any number of further actions. In one or more embodiments, these further actions may be accessible via individual tabbed windows.

Figure 7:
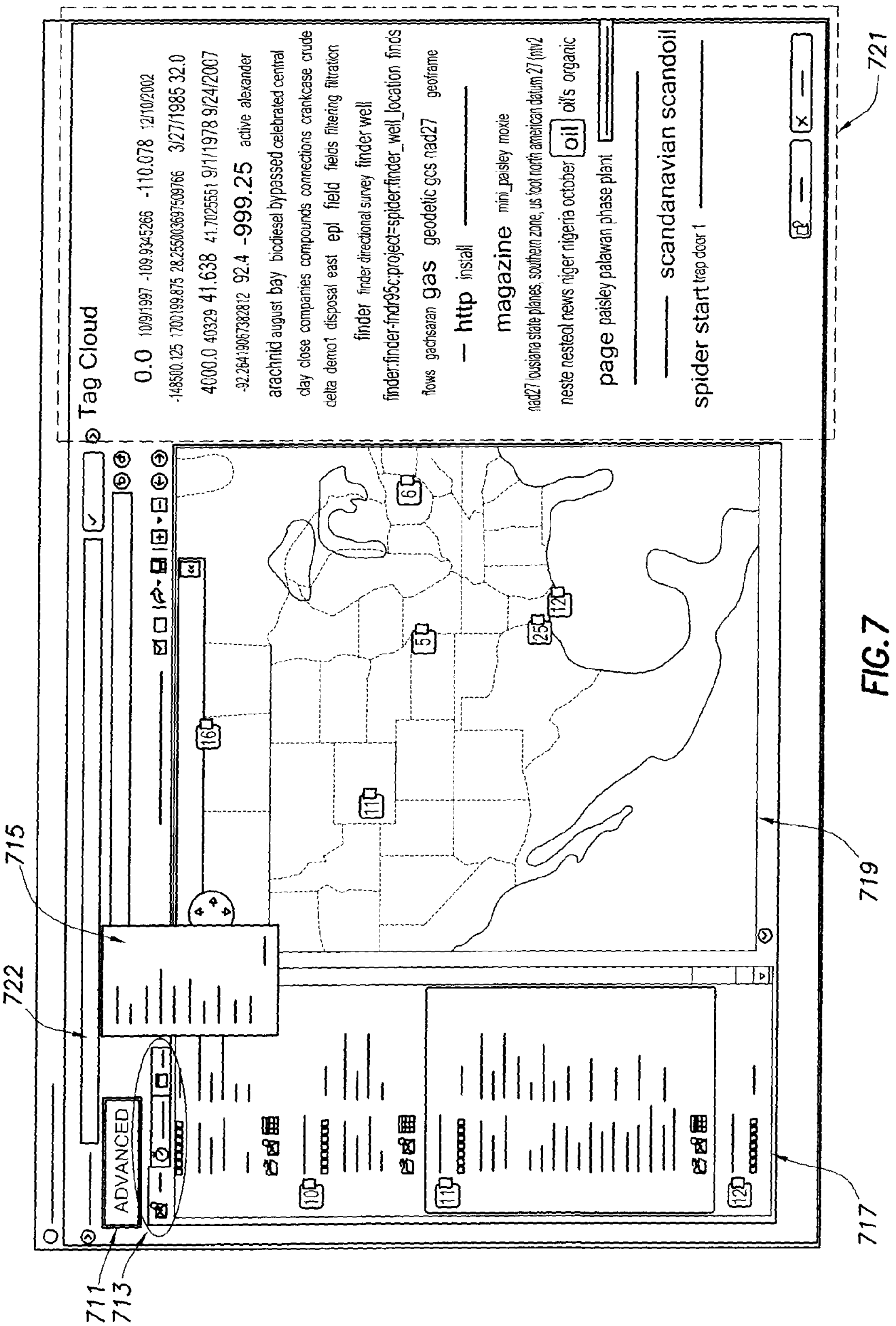
FIGS. 7 and 8 depict example displays of data context service windows in additional configurations.
Figure 8:
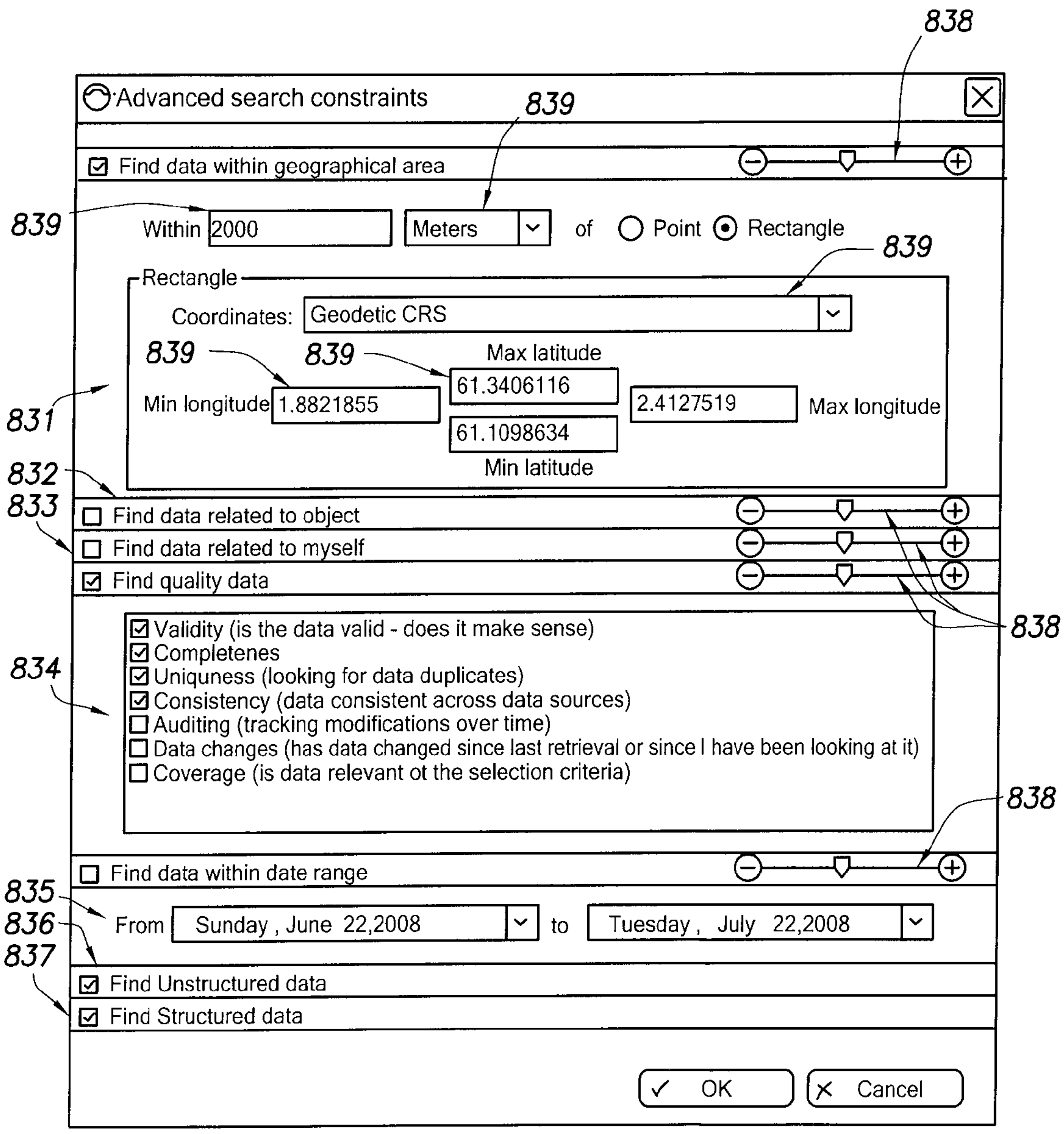

FIGS. 7 and 8 show example displays of data context service windows in additional configurations. The example display shown in FIG. 7 includes an advanced button (711), a search keyword input field (722), a search results selection tabs (713), a keyword suggestion drop down menu (715), a search results summary pane (717), a search results map pane (719), and a tag cloud pane (721). The example display shown in FIG. 8 depicts a search profile window activated via the advanced button (711). In one or more embodiments, the search profile window may be configured in various different format, for example, shown or hidden as a viewing pane.

As shown in FIG. 7, the search keyword input field (722) may be configured to receive user input keywords to limit the search further, where the keywords are applied in addition to the search profiles described with respect to FIG. 4 above. As discussed above, the search suggestion appliance (413 of FIG. 4) may present suggested terms in the keyword suggestion drop down menu (715) based on the current state of the user (e.g., various profiles, workflow states, etc.), the selected search profiles, and/or the application usage information maintained by the search suggestion appliance. For example, the keyword suggestion drop down menu (715) may be activated by a user accessing a context menu in the search keyword input field (722), where the user is seeking guidance with respect to further limiting the search.

Furthermore, while the user is entering a keyword into the search keyword input field (722), the search suggestion appliance may be configured to perform auto-completion by modifying the suggested terms in the keyword suggestion drop down menu (715) to match the already entered characters.

Further as shown in FIG. 7, the search results selection tabs (713) may be configured to format the search result page into a map format, a timeline format, a list format, or other formats not specifically shown in FIG. 7. As shown in FIG. 7, the search result page in map format includes the search results summary pane (717) and the search results map pane (719), which may be provided with the search profile window activated via the advance button (711) as an alternative format to the spatial search result page (610) described with respect to FIG. 6 above. In this case, the search results are identified at marked locations 5, 6, 11, 16, 25 in the search results map pane (719) with corresponding summary information listed in the search results summary pane (717), where search results details can be accessed by selecting (e.g., via mouse click or hover) any of the marked locations in the search results map pane (719) or the listed items in the search results summary pane (717).

In addition, the tag cloud pane (721) displays a tag cloud generated by the data tagging appliance (412) described with respect to FIG. 4 above. In this example, the tags in the tag cloud pane (721) are extracted from the search results details included in the search results summary pane (717) and the search results map pane (719). As shown, the tags are listed in alphanumerical order with respective font sizes corresponding to the frequency of occurrence tracked in the frequently used phrase record (417) described with respect to FIG. 4 above.

As discussed above, the example display shown in FIG. 8 may be activated via the advance button (711) depicted in FIG. 7. As shown, the example display includes one pane for each of the appliances to display a corresponding search profiles or quality criteria, where each of the panes may be expanded for collapsed. For example, the spatial context pane (831) is shown as expanded with various parameter fields (839) for specifying the spatial search profile. Similarly, the quality criteria pane (834) and the time frame context pane (835) are also shown as expanded with various parameter fields for specifying the selected quality criteria profile and the time frame search profile. The object context pane (832), the profile context pane (833), and additional context panes (836, 837) are shown as collapsed.

Initially, the various parameters in each pane of the search profile window described above contain default values determined based on the context information from when the context service engine is activated in the host application. In one or more embodiments, the search profile window allows the user to selectively modify the various parameters. The user modification may persist for the next search only, for the duration that the context service engine is active, until the user resets the search profiles or the quality criteria to the default values, or according to other predetermined schemes.

In one or more embodiments, the search profile window allows the user to combine search profiles/quality criteria corresponding to the various dimensions of relevance, such as spatial dimension, object dimension, profile dimension, time frame dimension, analog dimension, quality dimension, etc. For example, the user may specify the combination of the spatial and quality dimensions to retrieve only quality data in a specific geographical region. As shown in FIG. 8, the various search profiles/quality criteria (831-837) may be combined based on a weighted average scheme configured using the weighting controls (838), each weighting control (838) controlling the relative weighting of the individual search profile/quality criteria (831-837).

In one or more embodiments, the search suggestion appliance may be configured to suggest the most commonly used parameter values in the various panes of the search profile window based on the context information and the application usage information described above.

It will be understood from the foregoing description that various modifications and changes may be made in the embodiments of the data context service without departing from its true spirit. For example, additional context information categories, context appliances, and context search result pages may be added as new computer heuristics are devised. The context information may be automatically extracted or supplemented with user provided information. The context based search may be repeated according to the various configurations and the search results compared and/or analyzed.

Figure 9:
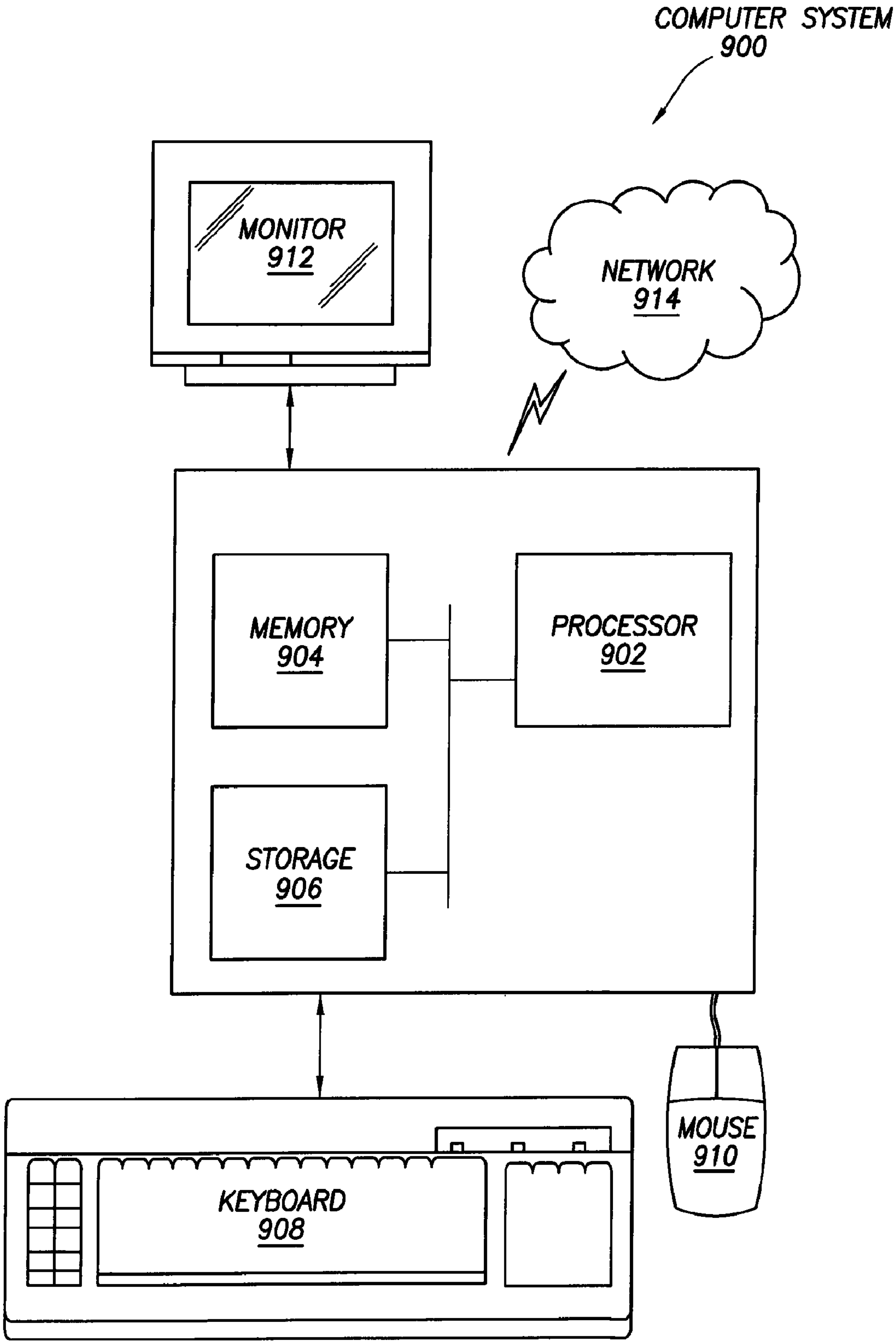
FIG. 9 depicts a computer system in accordance with one or more embodiments of the quality measure for data context service.

Embodiments of the quality measure for data context service may be implemented on virtually any type of computer regardless of the platform being used. For example, as shown in FIG. 9, a computer system (900) includes one or more processor(s) (902), associated memory (904) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (900) includes at least the minimal processing, input, and/or output means necessary to practice embodiments of the quality measure for data context service.

Further, those skilled in the art will appreciate that one or more elements of the aforementioned computer system (900) may be located at a remote location and connected to the other elements over a network (914). Further, embodiments of the quality measure for data context service may be implemented on a distributed system having a plurality of nodes, where each portion of the embodiments (e.g., various modules of FIG. 4) may be located on a different node within the distributed system. In one embodiment, the node corresponds to a computer system. Alternatively, the node may correspond to a processor with associated physical memory. The node may alternatively correspond to a processor with shared memory and/or resources. Further, software instructions for performing embodiments of the quality measure for data context service may be stored on a computer readable storage medium such as a compact disc (CD), a diskette, a tape, a file, or any other computer readable storage device. This description is intended for purposes of illustration only and should not be construed in a limiting sense.

The scope of the quality measure for data context service should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method for providing a data context service, comprising:

extracting context information from a host application associated with an oilfield project for analyzing an oilfield operation of an oilfield, the context information comprising a current state of analyzing the oilfield operation in the host application;

sorting the context information into a plurality of dimensions of relevance, wherein the plurality of dimensions of relevance comprise a profile context relating to a first identity of the oilfield project, an object context relating to a second identity of an oilfield object in the oilfield, and an analog context relating to a characteristic of oilfield data used in the host application;

generating, by a processor, a plurality of search profile for each of the plurality of dimension of relevance, wherein the plurality of search profiles comprises a first search profile adapted to evaluate a first relevance measure with respect to the first identity of the oilfield project, a second search profile adapted to evaluate a second relevance measure with respect to the second identity of the oilfield object, and a third search profile adapted to evaluate a third relevance measure with respect to the characteristic of oilfield data used in the host application;

automatically requesting a first plurality of searches using at least the plurality of search profile;

receiving a plurality of oilfield data items resulting from the first plurality of searches based on the first relevance measure, the second relevance measure, and the third relevance measure;

obtaining a quality measure of an oilfield data item of the plurality of oilfield data items based on a pre-determined quality criterion;

sending the oilfield data item as a search result to the host application after determining that the quality measure exceeds a pre-determined threshold; and generating an output using the host application based on the search result, the output being used to perform the oilfield operation.

2. The method of claim 1, wherein the plurality of oilfield data items comprise structured data and unstructured data, wherein the oilfield operation is at least one selected from a group consisting of a survey operation, a drilling operation, a simulator operation, and a processing operation, and wherein the context information relates to at least one selected from a group consisting of spatial information associated with the oilfield project, a workflow associated with the oilfield project, an oilfield object associated with the oilfield project, a time frame associated with the oilfield project, an analog context associated with the oilfield project, and a user role associated with the oilfield project.

3. The method of claim 1, wherein the quality measure is obtained from a third party data quality engine, and wherein the pre-determined quality criterion is selected by the user from a plurality of quality criteria of the third party quality engine.

4. The method of claim 1, further comprising:

identifying, in the search result, a plurality of phrases each associated with a corresponding usage measure based on a record of frequently used phrases;

selecting a phrase from the plurality of phrases based on the corresponding usage measure; and requesting a second plurality of searches using at least the search profile, wherein the second plurality of searches are limited by the phrase.

5. The method of claim 4, wherein the record of frequently used phrases is generated from searches performed from the host application prior to sending the oilfield data item as the search result.

6. The method of claim 4, wherein the phrase is selected by the user from the plurality of phrases.

7. The method of claim 1, further comprising:

receiving a third party search index, wherein the first plurality of searches are based on the third party search index; and sending the search result and the quality measure to a third party application.

8. The method of claim 1, further comprising:

generating application usage information from a plurality of users of the host application prior to requesting the first plurality of searches; and generating a suggested search phrase by correlating the context information to the application usage information, wherein the first plurality of searches are limited by the suggested search phrase.

9. The method of claim 1, further comprising:

generating application usage information from a plurality of users of the host application prior to requesting the first plurality of searches; and generating a suggested workflow action by correlating the context information to the application usage information, wherein the first plurality of searches are limited by the suggested workflow action.

10. A system for providing a data context service, comprising:

a repository; and memory storing instructions when executed by a processor comprising functionality for:

extracting context information from a host application associated with an oilfield project for analyzing an oilfield operation of an oilfield, the context information comprising a current state of analyzing the oilfield operation in the host application stored in the repository, sorting the context information into a plurality of dimensions of relevance, wherein the plurality of dimensions of relevance comprise a profile context relating to a first identity of the oilfield project, an object context relating to a second identity of an oilfield object in the oilfield, and an analog context relating to a characteristic of oilfield data used in the host application, generating a plurality of search profiles for each dimension of relevance, wherein the plurality of search profiles comprises a first search profile adapted to evaluate a first relevance measure with respect to the first identity of the oilfield project, a second search profile adapted to evaluate a second relevance measure with respect to the second identity of the oilfield object, and a third search profile adapted to evaluate a third relevance measure with respect to the characteristic of oilfield data used in the host application, automatically requesting a first plurality of searches using at least the plurality of search profiles, receiving a plurality of oilfield data items resulting from the first plurality of searches based on the first relevance measure, the second relevance measure, and the third relevance measure, obtaining a quality measure of an oilfield data item of the plurality of oilfield data items based on a pre-determined quality criterion, sending the oilfield data item as a search result to the host application after determining that the quality measure exceeds a pre-determined threshold, generating an output using the host application based on the search result, and storing the output in the repository, the output used to perform the oilfield operation.

11. The system of claim 10, wherein the plurality of oilfield data items comprise structured data and unstructured data, wherein the oilfield operation is at least one selected from a group consisting of a survey operation, a drilling operation, a simulator operation, and a processing operation, and wherein the context information relates to at least one selected from a group consisting of spatial information associated with the oilfield project, a workflow associated with the oilfield project, an oilfield object associated with the oilfield project, a time frame associated with the oilfield project, an analog context associated with the oilfield project, and a user role associated with the oilfield project.

12. The system of claim 10, wherein the quality measure is obtained from a third party data quality engine, and wherein the pre-determined quality criterion is selected by the user from a plurality of quality criteria of the third party quality engine.

13. The system of claim 10, wherein instructions when executed by the processor further comprise functionality for:

identifying, in the search result, a plurality of phrases each associated with a corresponding usage measure based on a record of frequently used phrases;

selecting a phrase from the plurality of phrases based on the corresponding usage measure; and requesting a second plurality of searches using at least the search profile, wherein the second plurality of searches are limited by the phrase.

14. The system of claim 13, wherein the record of frequently used phrases is generated from searches performed from the host application prior to sending the oilfield data item as the search result.

15. The system of claim 13, wherein the phrase is selected by the user from the plurality of phrases.

16. A computer readable storage medium storing instructions executing on a processor of a computer system, the instructions comprising functionality for providing a data context service by:

extracting context information from a host application associated with an oilfield project for analyzing an oilfield operation of an oilfield, the context information comprising a current state of analyzing the oilfield operation in the host application;

sorting the context information into a plurality of dimensions of relevance, wherein the plurality of dimensions of relevance comprise a profile context relating to a first identity of the oilfield project, an object context relating to a second identity of an oilfield object in the oilfield, and an analog context relating to a characteristic of oilfield data used in the host application;

generating a plurality of search profiles for each dimension of relevance, wherein the plurality of search profiles comprises a first search profile adapted to evaluate a first relevance measure with respect to the first identity of the oilfield project, a second search profile adapted to evaluate a second relevance measure with respect to the second identity of the oilfield object, and a third search profile adapted to evaluate a third relevance measure with respect to the characteristic of oilfield data used in the host application;

automatically requesting a first plurality of searches using at least the plurality of search profiles;

receiving a plurality of oilfield data items resulting from the first plurality of searches based on the first relevance measure, the second relevance measure, and the third relevance measure;

obtaining a quality measure of an oilfield data item of the plurality of oilfield data items based on a pre-determined quality criterion;

sending the oilfield data item as a search result to the host application after determining that the quality measure exceeds a pre-determined threshold; and storing the output, the output being used to perform the oilfield operation.

17. The computer readable storage medium of claim 16, wherein the instructions further comprises functionality for providing a data context service by:

generating application usage information from a plurality of users of the host application prior to requesting the first plurality of searches, and generating a suggested search phrase by correlating the context information to the application usage information, and wherein the first plurality of searches are limited by the suggested search phrase.

18. The computer readable storage medium of claim 16, wherein the instructions further comprises functionality for providing a data context service by:

generating application usage information from a plurality of users of the host application prior to requesting the first plurality of searches, and generating a suggested workflow action by correlating the context information to the application usage information, and wherein the first plurality of searches are limited by the suggested workflow action.

19. The computer readable storage medium of claim 16, wherein the plurality of oilfield data items comprise structured data and unstructured data, wherein the oilfield operation is at least one selected from a group consisting of a survey operation, a drilling operation, a simulator operation, and a processing operation, and wherein the context information relates to at least one selected from a group consisting of spatial information associated with the oilfield project, a workflow associated with the oilfield project, an oilfield object associated with the oilfield project, a time frame associated with the oilfield project, an analog context associated with the oilfield project, and a user role associated with the oilfield project.

20. The computer readable storage medium of claim 16, wherein the quality measure is obtained from a third party data quality engine, and wherein the pre-determined quality criterion is selected by the user from a plurality of quality criteria of the third party quality engine.

* * * * *